Oct. 13, 1970 E. W. LIPIEN 3,534,176
STATION RESTRICTION CIRCUIT FOR PRIVATE BRANCH EXCHANGE
Filed Jan. 19, 1968
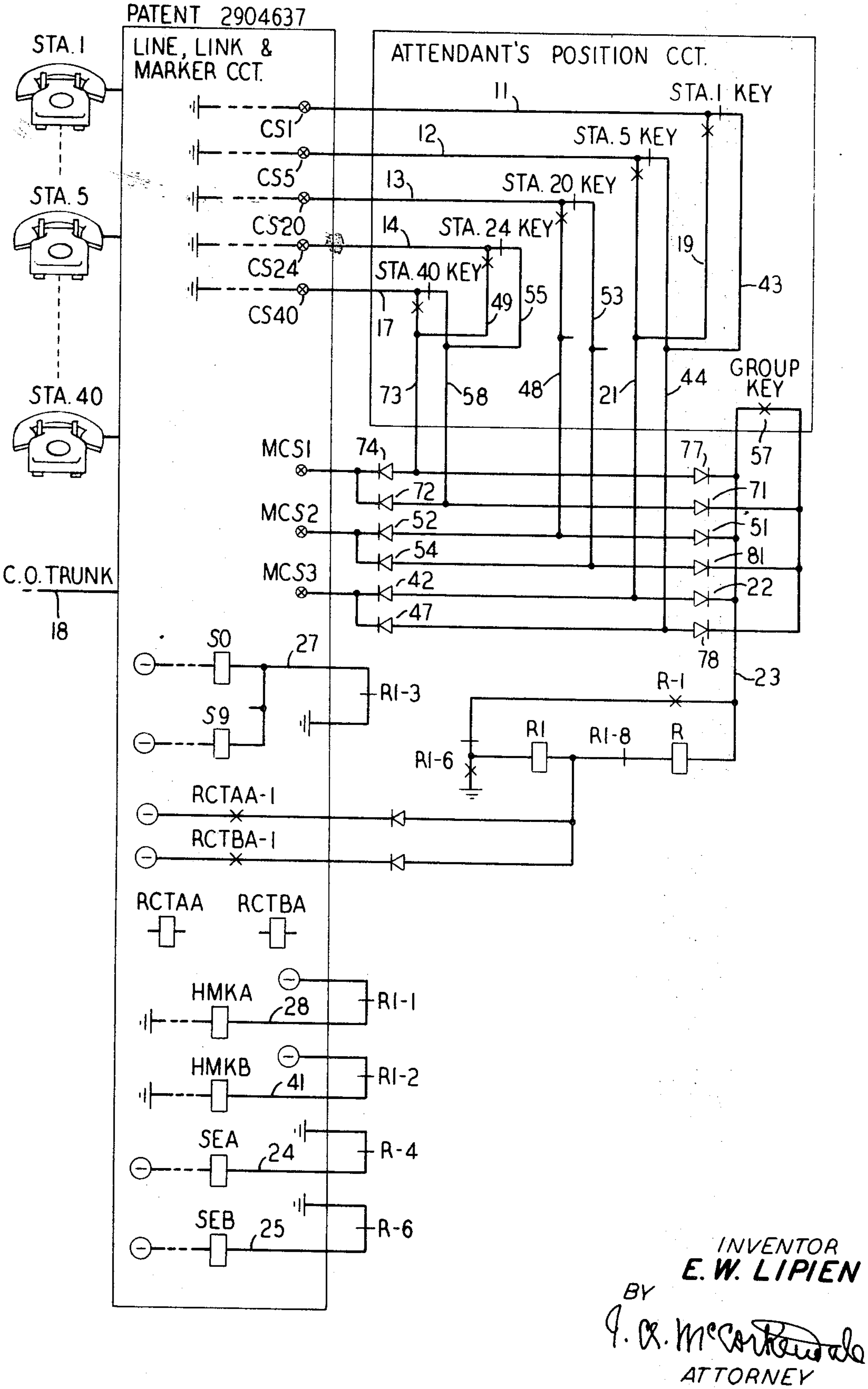
INVENTOR
E. W. LIPIEN
BY
J. R. McCorkendale
ATTORNEY United States Patent Office 3,534,176
Patented Oct. 13, 1970

3,534,176
STATION RESTRICTION CIRCUIT FOR PRIVATE BRANCH EXCHANGE

Edwin W. Lipien, Downers Grove, Ill., assignor to Western Electric Company, Incorporated, New York, N.Y., a corporation of New York Filed Jan. 19, 1968, Ser. No. 699,134
Int. Cl. H04m *3/38, 3/60*
U.S. Cl. 179—27 6 Claims

ABSTRACT OF THE DISCLOSURE

A station restriction circuit for use with crossbar type PBX's includes a restriction relay and station key contacts for controlling the relay inserted in the class-of-service leads of the respective stations. A special two-leg arrangement of the leads is provided whereby continuity of the leads between the station CS terminals and the marker CS terminals is maintained regardless of the open or closed position of the station key contacts connected in the respective lead.

BACKGROUND OF THE INVENTION

In instances where a telephone customer, for example a business firm, a Government agency, or the like, requires a relatively large number of stations, or extensions as they are also commonly designated, it is the usual practice to provide on the premises, or conveniently located thereto, a branch exchange commonly referred to as a private branch exchange or, more simply, as a PBX. The larger PBX's are usually served by one or more attendants from an attendant's position. A PBX or a type capable of serving a relatively large number of extensions and providing many advantageous features is disclosed in U.S. Pat. 2,904,637 issued Sept. 15, 1959 to R. D. Williams.

Before the advent of the so-called "direct inward dialing" feature in PBX operations, one important duty of the attendant was to monitor calls incoming from subscribers served by other central offices and to complete the connection to the desired extension or station of the PBX. However, since in many instances the particular extension can now be dialed directly by the outside subscriber, the majority of such connections are completed under present day practices without any participation at all on the part of the attendant. While such direct completion of calls to PBX stations represents, of course, a very desirable advance in switching practices, it is recognized that on certain occasions and under some circumstances it is desirable that the attendant be able, at least on a temporary basis, to restrict selected extensions of the PBX from receiving incoming calls. For example in some types of installations, particularly hospital installations, it may be considered undesirable to have certain of the extension users receive telephone calls at certain times or under particular circumstances. In other instances certain extensions of a PBX may be temporarily "vacant" due to personnel shifts. In all such cases of this general nature it is desirable that attempted calls to the restricted station be intercepted and directed to the attendant who may then explain to the calling party the reason for the interception.

Previously proposed restriction arrangements have often proven unsatisfactory since their addition to existing PBX installations has resulted in problems of location in the inherent closely spaced equipment of the PBX as well as circuit problems in the necessary modification of and additions to the existing switching network. Ideally, the arrangement should be such that the feature can be added by way of a simple applique unit with the least possible change in the mechanical and electrical arrangement of the existing PBX.

Accordingly it is an object of my invention to improve the operation of PBX's.

Another object of the invention is to enhance and improve station restriction facilities associated with a PBX.

Yet another object of the invention is to enhance and improve the restriction of PBX stations on the basis of selected groups.

Still another object of my invention is to simplify and facilitate the addition of station restriction facilities to existing PBX's.

In the subsequent description, the terms "station" and "extension" may be used interchangeably referring to the station sets of the PBX and the terms "subscribers" and "customers" may be used interchangeably in referring to persons served thereby.

SUMMARY OF THE INVENTION

In accordance with a specific embodiment of my invention selected stations of a private branch exchange are temporarily restricted from receiving calls as controlled from the attendant's console. Stations are selected for restriction either individually by closing the respective station key at the console, or in groups by closing a common "group" key. Resulting operation of the "restrict" relay inhibits operation of certain marker relays and causes the connection to be routed to the attendant on an intercept basis. The controlling contacts of the respective station keys are inserted in the class-of-service leads of the respective stations and a special two-leg arrangement of the leads is provided whereby continuity of the lead between the station CS terminal and the marker CS terminal is maintained regardless of the open or closed position of the station key.

A feature of my invention is a special arrangement of a class-of-service lead whereby the lead may be utilized for an additional separate controlling function without interfering with the original function of transmitting class-of-service information.

A further feature is a grouping key arrangement whereby a number of stations may be controlled as a group by operation of a single key.

A still further feature of my invention is the inclusion of diodes in the various leads whereby to properly segregate the paths and to prevent electrical backup in the separate leads.

BRIEF DESCRIPTION OF THE DRAWING

A full understanding of the arrangement contemplated by the present invention as well as an appreciation of the various advantageous features thereof may be gained from consideration of the following detailed description in connection with the accompanying drawing, the single figure of which shows schematically a station restriction arrangement operating in conjunction with a crossbar PBX as contemplated by one specific illustrative embodiment of my invention.

DETAILED DESCRIPTION

Referring now to the drawing, the station restriction arrangement is illustrated as used in conjunction with a PBX of the crossbar type. Portions of the PBX itself are shown in highly schematic form; for purposes of simplified disclosure it will be assumed that the PBX follows the general arrangement described in detail in R. D. Williams Pat. No. 2,904,637, issued Sept. 15, 1959. The station restriction circuit contemplated by the present invention is particularly adapted to use in conjunction with the basic switching patent and such circuits fully described in the Williams patent and such circuits will be described in the present disclosure only to the extent necessary for full understanding of the present invention.

It will be assumed, merely by way of example, that forty stations or extensions are served by the PBX, three of the stations STA No. 1; STA No. 5, and STA No. 40 being shown schematically in the drawing. The PBX station lines as well as the incoming lines and trunks are associated with the line, link and marker circuit in the normal manner as fully set forth in the Williams patent referred to above. A number of different classes of service are available for each station, and in line with this, a separate CS– (class-of-service) terminal is provided individual to each station. Five of these terminals are illustrated, CS1 (station No. 1); CS5 (station No. 5); CS20 (station No. 20); CS24 (station No. 24); and CS40 (station No. 40). Each station class-of-service terminal is connected to the proper class-of-service terminal of the marker either individually or in multiple with terminals of other stations having the same class-of-service assignment. It will be assumed that in the present instance three different classes of service are provided and that stations No. 1 and No. 5 are assigned class-of-service No. 3; that station No. 20 is assigned class-of-service No. 2; and that stations No. 24 and No. 40 are assigned class-of-service No. 1. Accordingly, leads 11 (station terminal CS1) and 12 (station terminal CS5) are connected in multiple to marker class-of-service terminal MCS3; lead 13 (station terminal CS20) is connected to marker terminal MCS2; and leads 14 (station terminal CS24) and 17 (station terminal CS40) are connected in multiple to marker terminal MCS1.

Now, as previously indicated above and as will be clear from the subsequent detailed description, the novel restriction arrangement contemplated by my invention takes advantage of the existence of these class-of-service leads whereby to utilize the leads for the additional function of control of the restriction feature wthout interfering in any manner with the original functions of the connections. Briefly, this desirable result is attained by modifying a portion of each lead to comprise a two-leg parallel section and including a transfer pair of station key contacts in each section so modified. These transfer contacts, in turn, control the operation of a "restrict" relay. It will be noted further, in connection with the novel grouping feature, that the arrangement of the connecting leads is such that a first series path is provided from each station class-of-service terminal through the break contact of the respective station key, through a respective diode and through the make contact of the group key to the operate winding of the restriction relay, and that a second series path is provided from the same class-of-service terminal through the make contact of the same respective station key and through a second diode to the winding of the restriction relay, this second path being exclusive of the group key contact. Through this novel arrangement of the group key in relation to the individual station keys, closure of the group key is effective to initiate the restriction function when all station keys are left in nonoperated position and when a call is received at the PBX directed to any one of the grouped stations while, at the same time, the group restriction feature remains fully operative for all stations even though one or more of the station keys may be left in closed position through inadvertence or otherwise. It will be obvious, of course, that in no instance is the continuity of the path between the station class-of-service terminal and the marker class-of-service terminal interrupted.

Thus, in accordance with my invention, each of the station class-of-service terminals CS– is connected by a lead including a two-legged section to the appropriate marker class-of-service terminal MCS–. Specifically as shown, lead 11 from station class-of-terminal CS1 includes the two legs 19 and 43, lead 12 from terminal CS5 includes the two legs 21 and 44, lead 13 from terminal CS20 includes the two legs 48 and 53, lead 14 from terminal CS24 includes the two legs 49 and 55, and lead 17 from terminal CS40 includes the two legs 73 and 58. As indicated, the two-legged parallel section of other leads for other stations with the same marker class-of-service may be multiplied to each of the two legged sections connected through the diodes 74, 72, 52, 54, 42, and 47 to the marker class-of-service terminals MCS1, MCS2, and MCS3.

For purposes of further description it will be assumed that Station No. 1 is to be restricted from receiving incoming calls and that the corresponding station key STA 1 has accordingly been closed at the attendant's console. It will be assumed, further, that an incoming call central office trunk 18 directed to Station 1 is received at the PBX. In accordnace with the inherent operation of the PBX switching circuits, not shown in detail in the present instance but fully disclosed in the Williams Pat. 2,904,637 referred to above, ground is connected by the marker to the station class-of-service terminal of a respective station during the switching of a call received at the PBX directed to that particular station. Accordingly, ground is applied to station class-of-service terminal CS1 at this time. This ground is connected to lead 11 and, since STA 1 key is closed, is applied via leg 19 of the lead, leg 21 of lead 12, through diode 22, lead 23, winding of "restrict" relay R, break contact R1–8, to battery at make contacts RCTAA–1 and RCTBA–1. ("Register cut through" relays RCTAA and RCTBA are in operated condition at this point due to the inherent marker functioning.)

Relay R, operated, opens paths 24 and 25 at respective break contacts R–4 and R–6 whereby to prevent operation at this point of marker "sleeve end" relays SEA and SEB; the purpose of this action is merely to prevent the possible introduction of any undesirable changes in the normal timing train of the marker due to addition of the restriction function contemplated by the present invention.

Also, relay R operated closes at make contact R–1 an operate path for relay R1 from the same ground and battery effective in the operation of relay R. Relay R1, upon operating, locks to ground at the make contact of its transfer pair R1–6 and interrupts at break contact R1–8 the operate path of relay R which now releases. Also, relay R1, operated, opens path 27 at break contact R1–3 whereby to release the operated "sleeve" relay in the group S0–S9 and also opens paths 28 and 41 at respective break contacts R1–1 and R1–2 whereby to prevent the operation at this point of "hold check" relays HMKA and HMKB.

As fully described in the Williams Pat. 2,904,637 previously referred to, the inherent functioning of the marker is such that, when the respective sleeve relay S0–S9 and the hold check relays HMKA and HMKB stand released at this point in an attempted call completion, the call will be automatically routed to the attendant on an intercept basis. Accordingly, the call incoming over trunk 18 to station 1, temporarily restricted against receiving incoming calls, is routed to the attendant on an intercept basis. The attendant, alerted to the intercepted call by visual or audible signals, he answers the call and explains the reason for the intercept.

It will be understood that relays S0–S9; RCTAA and RCTBA; HMKA and HMKB; and SEA and SEB are all standard relays of the PBX switching circuits and all perform their normal functions as taught by the Williams Pat. 2,904,637 except insofar as these normal functions are modified in accordance with the novel manner contemplated by my invention whereby to provide the restriction feature.

Following routing of the call to the attendant's position, relays RCTAA and RCTBA release in line with normal marker operation; this is followed by release of relay R1 since battery on the holding path is removed at make contacts RCTAA–1 and RCTBA–1. Relays HMKA and HMKB can now operate over the normal marker operate paths since leads 28 and 41 are closed at break contacts R1–1 and R1–2, respectively.

It will be apparent that, because of the novel lead arrangement provided by my invention, the required continuous path between station terminal CS1 and marker terminal MCS3 for station 1 is maintained regardless of the condition, operated or released, of the key STA 1. Thus, with the key closed as described above, the path is maintained via leg 19 of lead 11, leg 21 of lead 12 and diode 42, while, when the key is open, the continuous path is maintained via leg 43 of lead 11, leg 44 of lead 12 and diode 47.

Other stations may be individually restricted in the same general manner as that described above with reference to station 1. For example, if station No. 20 be restricted by closing STA 20 key, and assuming that an incoming call directed to station No. 20 is received at the PBX, for example, by way of central office trunk 18, ground now conected to station terminal CS20 will be applied via leg 48 of lead 13, diode 51 and lead 23 to operate restrict relay R, as described above. Through subsequent operation of relay R1 the call will be diverted to the attendant's position on an intercept basis.

In the instance described just above a continuous path is maintained between station terminal CS20 and marker terminal MCS2 via leg 48 and diode 52 while, if STA 20 key were open, the path would then be maintained via leg 53 of lead 13 and diode 54.

It will be clear from the above description that stations are individually selected for restriction by operation of the respective station keys and it will be readily apparent that, while control contacts ofthe station keys have been inserted in the respective class-of-service leads, nevertheless the continuity of the leads between the station CS terminals and the marker CS terminals is maintained regardless of the position, open or closed, of the respective station key contacts.

If desired, stations may be restricted in a group simply by closing make contact 57 of the group key provided at the attendant's console. With this contact closed, a ground applied to any of the station CS terminals will cause operation of restrict relay R and subsequent routing of the call to the attendant on an intercept basis. In this case all of the individual station keys will customarily be left in released postion although, as apparent from previous description of the group key arrangement, this is not essential for proper operation of the restriction feature.

With group key contact 57 closed it will be assumed that an incoming call directed to station No. 40 is received at the PBX; it will be assumed, further, that all the station keys have been left in open position. Ground now connected to station terminal CS40 is appled through the break contact of STA 40 key transfer pair, leg 58 of lead 17, diode 71, make contact 57, lead 23, winding of relay R, break contact R1–8 to battery at make contacts RCTAA–1 and RCTBA–1. Relay R operates; this is followed by operation of Relay R1 and subsequent routing of the connection to the attendant on an intercept basis as described above.

It will be apparent that a continuous path between station terminal CS40 and marker terminal MCS1 is maintained via leg 58 and diode 72. Had STA 40 key been in operated, or closed position, this continuous path would then have been maintained via leg 73 of leg 17 and diode 74, while the operate path for "restrict" relay R would then have been completed directly to lead 23 via diode 77, make contact 57 of the group key being excluded from the operate path in this instance.

It will be readily apparent that, with group key contact 57 closed, ground applied to any one of the CS1–CS40 station terminals will result in operation of relays R and R1 and initiation of the restriction function; it will be apparent, further, that this restriction function will be effectuated regardless of the condition of the several station keys and also that the continuity of all leads between the respective station class-of-service terminals and the marker class-of-service terminals will be maintained, again regardless of the condition of the several station keys. Provision of the diodes, as 22; 42; 74; 77; 54; 81; 47; 78; 52; 52; 72; 71; prevents possible current "back-up" in the station leads when group key contact 57 is closed.

It will be apparent that the arrangement contemplated by my invention is such that the restriction feature can readily be added as an applique to existing installations without any substantial problems from the standpoint of mechanical space or circuit changes. The availability of the class-of-service leads is taken advantage of in a novel manner for selective control of the restrict relay without disturbing in any way the normal function of the leads for conveying class-of-service signals. Further, normal functions of certain of the existing marker relays are appropriated in a unique manner for purposes of the restriction feature.

While the above description concerns the restricting of a call to a PBX station from an incoming trunk, the same operations will occur when the call to a restricted station is from another PBX station.

It is to be understood that the above-described arrangements are illustrative of the application of the principles of the invention. Numerous other arrangements may be devised by those skilled in the art without departing from the spirit and scope of the invention.

What is claimed is:

1. An inward restriction control circuit for a marker controlled private branch exchange telephone system including a plurality of stations, an attendant's position circuit, a class-of-service terminal for each station, a lead connecting each of said terminals to a class-of-service terminal in the marker, means controlled from the position circuit for temporarily restricting selected ones of the stations from receiving calls, said means including a first relay and station key contacts for controlling operation of said relay included in each of said connecting leads, and means for maintaining the continuity of each of said leads between the respective station class-of-service terminal and the marker class-of-service terminal regardless of the open or closed condition of said station key contacts.

2. In an inward restriction control circuit the combination defined by claim 1 further characterized in that said continuity maintaining means includes a parallel two-leg section in each of said connecting leads, a make contact of each respective station key being included in one leg of the section of the associated lead and a break contact of the key being included in the other leg of the same respective section.

3. In an inward restriction control circuit the combination defined by claim 2 further characterized in a group key and means effectuated by closure of said group key for operating said first relay when ground is applied to any of said station class-of-service terminals when the associated station key is in open position.

4. An inward restriction control circuit for a marker controlled private branch exchange telephone system including a plurality of stations and an attendant's position, a class-of-service terminal and a station key for each station, a lead connecting each of said terminals to a class-of-service terminal in the marker, and means controlled from said attendant's position for temporarily restricting selected ones of the stations from receiving calls, said means including a restriction relay having an operate path, station key contacts included in each of said leads, first means for closing said operate path when ground is applied to a respective one of said station class-of-service terminals when the respectively associated station key is in closed position and second means for closing said operate path when ground is applied to any of said station class-of-service terminals when the associated station keys are in open position.

5. In an inward restriction control circuit the combination defined by claim 4 further characterized in that said second operate path closing means includes a group key having a make contact, and paths including said group key make contact and a break contact of each of said station keys connecting each of said station class-of-service terminals to the operate winding of said restriction relay.

6. An inward restriction control circuit for a marker controlled private branch exchange telephone system including a class-of-service terminal for each extension, a class-of-service lead connected to the marker for each class-of-service, and control means connected to said class-of-service terminals and said class-of-service leads, said control means including a restriction relay, a station key for each extension and having a make and a break contact connected to each class-of-service terminal, group key having a make contact, first conducting means including a first diode connecting each station key make contact to said restriction relay, second conducting means including a second diode connecting each station key break contact through said group key make contact to said restriction relay, and third and fourth diode means connecting said first and second conducting means respectively to said class-of-service leads to the marker.

References Cited

UNITED STATES PATENTS

| | | | |
|---|---|---|---|
| 3,435,150 | 3/1969 | Albrecht | 179—27 |
| 3,180,942 | 4/1965 | Matthews | 179—27 |

KATHLEEN H. CLAFFY, Primary Examiner

T. W. BROWN, Assistant Examiner

U.S. Cl. X.R.

179—27